United States Patent [19]

Fujiwara et al.

[11] 4,182,898

[45] Jan. 8, 1980

[54] STABLE AND STORABLE POLYESTER-POLYETHER CO-PREPOLYMERS

[75] Inventors: Edward J. Fujiwara; Michelle D. Pate, both of Adrian, Mich.

[73] Assignee: Anderson Development Company, Adrian, Mich.

[21] Appl. No.: 871,330

[22] Filed: Jan. 20, 1978

[51] Int. Cl.$^2$ .................... C07C 125/04; C08G 18/48
[52] U.S. Cl. ........................ 560/26; 528/66; 528/76; 528/83; 528/906
[58] Field of Search .............. 260/75 NK, 75 NP; 528/66, 83, 76, 906; 560/26

[56] References Cited

U.S. PATENT DOCUMENTS

| | | | |
|---|---|---|---|
| 2,953,539 | 9/1960 | Keplinger et al. | 260/31.6 |
| 2,998,403 | 8/1961 | Mueller et al. | 260/75 NP |
| 3,004,939 | 10/1961 | Varvaro | 260/22 TN |
| 3,148,162 | 9/1964 | Gmitter et al. | 260/2.5 AB |
| 3,384,624 | 5/1968 | Heiss | 260/77.5 |
| 3,483,150 | 12/1969 | Ehrlich et al. | 260/75 NP |
| 3,493,634 | 2/1970 | Kolycheck | 260/75 NP |
| 3,664,979 | 5/1972 | Tanomura et al. | 260/75 NK |
| 3,684,770 | 8/1972 | Meisert et al. | 528/906 |
| 3,886,651 | 2/1975 | Gomberg | 260/75 NP |
| 4,029,593 | 6/1977 | Schapel et al. | 252/182 |
| 4,125,545 | 11/1978 | Kroplinski et al. | 528/76 |

*Primary Examiner*—H. S. Cockeram
*Attorney, Agent, or Firm*—Browdy and Neimark

[57] ABSTRACT

Polyurethanes having improved properties are obtained from polyester-polyether co-prepolymers. These co-prepolymers are homogeneous, clear liquids of varying viscosity and can be reacted with curing agents to yield clear homogeneous elastomers of various hardness. Cast elastomers prepared from such co-prepolymers have physical properties at least as good as premium polyester urethanes currently available, and have hydrolytic stability and low temperature properties better than such premium polyester urethanes and comparable to premium polyether urethanes, with the cost being comparable to the lower cost of the conventional polyester systems.

7 Claims, No Drawings

STABLE AND STORABLE POLYESTER-POLYETHER CO-PREPOLYMERS

FIELD OF INVENTION

The present invention relates to polyurethane elastomers and, more particularly, to polyester-polyether co-prepolymers useful in the manufacture of superior polyurethane elastomers.

BACKGROUND OF THE INVENTION

Prepolymers presently available commercially for the casting of polyurethane elastomers are either of the polyester type or the polyether type; the latter, for example, are often based on polytetramethylene glycol (PTMG), polyoxypropylene glycol (PPG), or modifications thereof with polyoxyethylene.

Cast elastomers prepared from polyester prepolymers in general have better mechanical properties, especially at higher operating temperatures, and better hysteresis properties than elastomers prepared from polyether prepolymers. In addition, they are normally less expensive than polyurethane elastomers prepared from polyether prepolymers based on PTMG. On the other hand, polyether-based polyurethane elastomers have better hydrolytic stability and low temperature properties than elastomers based on polyester prepolymers.

While it might seem that polyurethanes having desirable properties might be obtained by using a mixture of both polyester and polyether components, and in fact this has been attempted to some extent as noted below in different types of systems, at present there are no commercially available polyester-polyether co-prepolymers. One reason for this is that it is accepted in the industry by both manufacturers of prepolymers and end-use fabricators, that polyester prepolymers and polyether prepolymers are generally incompatible and cannot be used in combination.

True prepolymers are made from reactants which have a total NCO/OH ratio on the order of, but no greater than, 2/1. The resultant prepolymers are thus isocyanate terminated without residual hydroxy terminal groups, e.g.

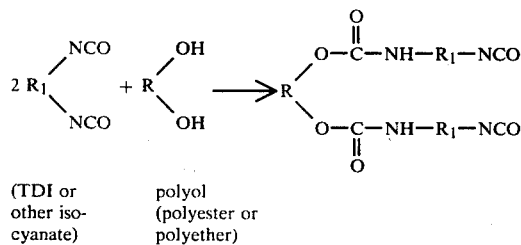

(TDI or other isocyanate)    polyol (polyester or polyether)

On the other hand, if the NCO/OH ratio of the reactants is greater than 2:1, what results is a mixture of free or unreacted diisocyanate with prepolymer, termed a quasi-prepolymer. However, such quasi-prepolymers are highly undesirable as products of commerce. The unreacted isocyanate renders the product unduly reactive and, thus, when used to make a cast polyurethane by mixing with a curing agent, the mixture reacts too quickly, e.g. before the mixture can flow and fill all parts of the mold. In addition, many free or unreacted isocyanates are both environmentally dangerous and relatively volatile; thus, great care must be exercised in ensuring that quasi-prepolymers are not subjected to heat.

As the ratio of NCO to OH approaches 1:1 from 1.5:1, the number of reactive NCO groups becomes progressively less, and at the NCO/OH ratio of 1:1, the product is no longer a prepolymer at all, but is a finished polyurethane polymer. At NCO/OH ratios less than 1, one obtains hydroxyl terminated prepolymers. These prepolymers, normally useful as components in coatings and sealant systems, are not conventionally used for casting and if so used, do not provide high performance elastomers. They are cured with different curing systems than are used for NCO terminated prepolymers, e.g. NCO terminated prepolymers may serve as curing agents for hydroxyl terminated prepolymers.

The 1961 U.S. Pat. to Mueller et al No. 2,998,403 broadly discloses reacting a diisocyanate with a linear hydroxy polyester and an hydroxy polyether, in which the ether oxygen atoms are separated by carbon chains of at least three carbon atoms. Various procedures are given for interreacting the three components and at column 2, lines 64–72, it is mentioned that the hydroxyl polyester may be first reacted with an excess of diisocyanate, followed by reaction with the hydroxyl polyether so as to provide an excess of hydroxyl groups, i.e. an NCO/OH ratio of les than one; subsequently, this hydroxyl terminated prepolymer is reacted with more diisocyanate to provide the final product. A true co-prepolymer of NCO/OH ratio greater than 1:1 and no greater than 2:1 is not provided, even transiently.

The Ellegast et al U.S. Pat. No. 3,274,160 discloses the preparation of a three component quasi-prepolymer in which excess polyisocyanate, at least 300% excess, is reacted with a polyhydric alcohol (e.g. trimethylpropane, 1,4-butenediol, glycerine, etc.) and an organic compound which is a polyester or polyether polyol of molecular weight greater than 800. The quasi-prepolymer so prepared is then in a later stage reacted with more polyhydric alcohol. No mixture of polyester and polyether polyols is suggested and, moreover, the NCO/OH ratio in the quasi-prepolymer is substantially in excess of 2:1.

The U.S. Pat. No. to Murphy 3,033,825 discloses casting polyurethane rubbers made from polyester prepolymers, e.g. using a glycol and adipic acid or isophthalic acid. Polyether glycols are also mentioned, but there is no disclosure of the preparation and isolation of isocyanate-terminated co-prepolymers containing both polyester and polyether glycols, nor is there any disclosure of the use of polyethers and polyesters together.

Murphy U.S. Pat. No. 3,098,658 discloses reacting a polyol, a polyether glycol and a diisocyanate to prepare finished polyurethane compositions. There is no disclosure of the preparation and isolation of isocyanate-terminated co-prepolymers containing both polyester and polyether glycols.

Kolycheck U.S. Pat. No. 3,493,634 shows the preparation of an injection moldable (thermoplastic) polyurethane formed by the reaction of a mixture of an hydroxyl-terminated polyester, an hydroxyl poly (alkylene oxide), an aliphatic glycol and an aryl diisocyanate. There is no mention of the preparation and isolation of a co-prepolymer containing a mixture of polyester and polyether polyols.

The above noted patents were found during a preliminary patentability search. Also found at that time were U.S. Pat. No. 3,528,948 to Reuter which shows the preparation of thermoplastic polyurethanes, similar to Kolycheck discussed above; and the Werner U.S. Pat. No. 3,980,606 which relates to the preparation of prepolymers from mixed polyether polyols. Other patents found during this search, of somewhat less interest, and also not disclosing or suggesting the preparation and isolation of co-prepolymers based on a mixture of polyester and polyether polyols, are: U.S. Pat. Nos. 2,729,618; 3,061,574; 3,094,495; 3,268,488; 3,370,996; and 3,963,681.

SUMMARY OF THE INVENTION

It is, accordingly, an object of the invention to overcome deficiencies in the prior art, such as indicated above.

It is another object to provide for improved polyurethane resins.

It is yet another object to provide stable co-prepolymers useful in the preparation of polyurethane resins having good properties, which co-prepolymers are liquid at normal temperature and have ether and ester groups in the prepolymer backbone and obtained from the reaction between an isocyanate and a mixture of polyester and polyether polyols at an NCO/OH ratio from 1.5:1 to 2:1.

Another object of the present invention is to provide stable polyester/polyether prepolymers which can be formed into polyurethane elastomers having all the good physical properties of premium polyesters, along with the hydrolytic stability and low temperature properties of premium polyether polyurethanes, and at a less expensive cost compared with the cost of premium polyether polyurethanes based on PTMG.

These and other objects of the invention are achieved in general by forming a prepolymer by reaction with a diisocyanate of a compatible mixture of a polyester glycol and a polyether glycol, it being critical that the polyether glycol and the polyester glycol be mutually soluble. The quantities of polyester and polyether may be varied to give different properties in the final product, and the quantity of diisocyanate is so selected to provide, in the reaction mixture, an NCO/OH ratio from 1.5:1 to 2:1. The resultant co-prepolymers are homogeneous, clear liquids at normal temperatures of varying viscosity which can be reacted with appropriate curing agents to yield homogeneous polyurethane elastomers having varying physical properties. A key feature of the present invention is the mutual solubility of the polyester and polyether; while it is difficult to predict whether any selected polyester and polyether will be mutually soluble, other than the combinations exemplified below, such solubility can be determined by routine testing by simply mixing the two in equal proportions; if mutually soluble in equal proportions, they are also soluble in other proportions and are usable together in the practice of the present invention.

For a better understanding of the invention, possible embodiments thereof will now be described, it being understood that such embodiments are intended as merely exemplary and in no way limitative.

DETAILED DESCRIPTION OF EMBODIMENTS

An important feature of the present invention lies in the selection of the polyester and the polyether such that these are mutually soluble, i.e. they are compatible. For any contemplated system, the determination of mutual compatability is quite simple: one merely mixes the polyester and polyether at a 1:1 weight ratio. If they are soluble, in equal proportions, they are soluble at any other ratio. If the polyols are not soluble at the 1:1 ratio, further studies at both ends of the dilution scale are made to determine at what ratio they are mutually soluble, i.e. if not mutually compatible at a 1:1 ratio, one may still be soluble in the other. Thus the normally skilled artisan may readily mix 25% polyester with 75% polyether to determine the solubility at this particular ratio; or he may mix 25% polyether in 75% polyester to check the solubility of the polyether in the polyester. In any event, it is seen that for any starting materials, the procedure to determine compatibility is relatively simple and routine.

In general, it has been found that polyether and polyester polyols covering the molecular weight range of 400 to 4000 can form mutually homogeneously soluble solutions at varying concentrations, these, in turn, being converted to clear homogeneous co-prepolymers using an amount sufficient of any suitable di- or polyisocyanate to provide an NCO/OH ratio in the reactants of from 1.5:1 to no greater than 2:1. The resultant co-prepolymers are stable, clear liquids of varying viscosity at normal temperature and can be stored like currently commercially available prepolymers.

In general, polyester polyols containing high aromaticity, such as provided by phthalic, isophthalic, and terephthalic acids, and a higher aliphatic character in the diol segment, such as provided by 1,6-hexane diol instead of ethylene glycol, are soluble and compatible with polytetramethylene glycol (PTMG) polyols. It has also been found that polypropylene glycol (PPG)-type polyols capped with ethylene oxide, the higher percentage of ethylene oxide the better, show solubility in and compatibility with polyester-type polyols based on aliphatic di-acids and ethylene and/or diethylene and/or tri- or tetra ethylene glycols.

The following are examples of polyesters suitable for use in the present invention:
Ethylene glycol adipate, MW 1000 and 2000.
Adipate-isophthalate of 1,6-hexane diol, MW 500, 1000 and 2000.
Propylene glycol adipate, MW 500, 1000 and 2000.
Adipate-isophthalate of neopentyl glycol and 1,6-hexane diol, MW 800, 1500, 2000 and 2500.
Adipate of neopentyl glycol and 1,6-hexane diol, MW 900, 1500 and 3000.
Isophthalate of glycerine, MW 750.
Adipate of diethylene glycol, 1,6-hexane diol, neopentyl glycol and trimethylol propane, MW 1800.

The following are examples of polyethers suitable for use in the present invention:
Polytetramethylene glycol, MW 650, 1000 and 2000.
Polyoxypropylene glycol, MW 1000 and 2000.
Ethylene oxide capped polyoxypropylene glycol, MW 1000, 2000, 3000 and 4000.

The following polyester/polyether polyols are mutually soluble:
A. Ethylene glycol adipate MW 1000 with ethylene oxide capped polyoxypropylene glycol MW 1000 and 2000.
B. Ethylene glycol adipate MW 2000 with ethylene oxide capped polyoxypropylene glycol MW 1000 and 2000.
C. Adipate-isophthalate of 1,6-hexane diol MW 2000 with ethylene oxide capped polyoxypropylene glycol MW 1000, 2000 and 3000 and polytetramethylene glycol MW 650 and 1000 and polyoxypropylene glycol MW 1000.

D. Adipate-isophthalate of 1,6-hexane diol MW 500 and 1000 with polytetramethylene glycol MW 650, 1000 and 2000 and ethylene oxide capped polyoxypropylene glycol MW 1000, 2000, 3000 and 4000 and polyoxypropylene glycol 1000 and 2000.

E. Propylene glycol adipate MW 2000 with ethylene oxide capped polyoxypropylene glycol MW 1000.

F. Propylene glycol adipate MW 1000 with ethylene oxide capped polyoxypropylene glycol MW 1000 and 2000.

G. Propylene glycol adipate MW 500 with ethylene oxide capped polyoxypropylene glycol MW 1000, 2000 and 3000 and polyoxypropylene glycol MW 1000.

H. Adipate-isophthalate of neopentyl glycol and 1,6-hexane diol MW 2000 with polytetramethylene glycol MW 650 and 1000 polyoxypropylene glycol MW 1000 and ethylene oxide capped polyoxypropylene glycol MW 1000, 2000 and 3000.

I. Adipate-isophthalate of neopentyl glycol and 1,6-hexane diol MW 800 with polytetramethylene glycol MW 650, 1000 and 2000 and polyoxypropylene glycol MW 1000 and 2000 and ethylene oxide capped polyoxypropylene glycol MW 1000, 2000, 3000 and 4000.

J. Adipate of neopentyl glycol and 1,6-hexane diol MW 3000 with polyoxypropylene glycol MW 1000 and ethylene oxide capped polyoxypropylene glycol MW 1000, 2000 and 3000.

K. Adipate of neopentyl glycol and 1,6-hexane diol MW 900 with polytetramethylene glycol MW 650, 1000 and 2000 and polyoxypropylene glycol MW 1000 and 2000 and ethylene oxide capped polyoxypropylene glycol MW 1000, 2000, 3000 and 4000.

L. Isophthalate of glycerine MW 750 with polytetramethylene glycol MW 1000 and polyoxypropylene glycol MW 1000 and ethylene oxide capped polyoxypropylene glycol MW 1000, 2000, 3000 and 4000.

M. Adipate of diethylene glycol, 1,6-hexane diol, neopentyl glycol and trimethylol propane MW 1800 with ethylene oxide capped polyoxypropylene glycol MW 1000, 2000 and 3000.

Other than the aspect of mutual compatibility or solubility in one another, there is no limit to what type of polyester and what type of polyether may be used in accordance with the present invention to provide the desired co-prepolymers. These polyols may be used in any relative proportions, although it will be understood that the greater the quantity of any one polyol, the more the properties of the resultant polyurethane will approach the properties of the polyurethane made from a conventional prepolymer of such particular polyol; as a practical matter to obtain significantly different properties, one should maintain the relative proportions of polyester and polyether between 15% and 85%.

There is also no limit on the type of compound which supplies the NCO groups to the prepolymer except that the present invention provides additional advantages where the polyisocyanate is a highly volatile material, i.e. has a high vapor pressure. Toluene diisocyanate (TDI), in its various isomeric forms, is a very commonly used volatile polyisocyanate and is highly suitable to provide the necessary NCO groups. But other volatile diisocyanates conventionally used in the preparation of urethane prepolymers, such as hexamethylene diisocyanate, can also be used in the preparation of co-prepolymers from the same polyol mixes. Other common volatile polyisocyanates which may be mentioned are 1,5 methylene diisocyanate, m-phenylene diisocyanate, diphenyl sulphone-4,4'-diisocyanate, and furfurylidene diisocyanate. Less volatile polyisocyanates can also be used in the present invention: thus, 4,4'-diphenyl methane diisocyanate (MDI) is readily commercially available, and isophorone diisocyanate is conventionally used in the preparation of urethane prepolymers; other useful polyisocyanates include triphenyl methane triisocyanate, dimethyl diphenyl methane diisocyanate and bitolylene diisocyanate.

After the co-prepolymers have been prepared by the reaction between the compatible polyester glycol, polyether glycol and polyisocyanate in proportions to provide an NCO/OH ratio in the reaction mixture of 1.5 to no greater than 2:1, thereby providing the homogenous, clear, stable isocyanate terminated co-prepolymer, such co-prepolymer may subsequently be reacted with appropriate curatives to yield clear homogeneous polyurethane elastomers of varying properties; in particular, it has been found that hardness can be varied considerably using the present co-prepolymers, and in examples carried out to date polyurethane elastomers have been prepared having a hardness range of 60A to 55D. Curing is effected using conventional curing agents, such as 4,4'-methylene-bis (orthochloro aniline), commercially available under the trademarks Curene® 442 (Anderson Dev. Co.) and MOCA® (Du Pont). Other standard curing agents such as 1,4-butane diol, trimethylolpropane, neopentylglycol, methylene dianiline, phenyldiethanol amine, triisopropanol amine, etc., can also be used to effect curing. Thus, any curing agent including those presently known, which can be used to cure presently commercially available prepolymers, can also be used to cure the co-prepolymers of the present invention. With regard to the quantity of curing agents, once again standard practice may be used, for example, a standard stoichiometry of 95%.

Variations may also be carried out as will be clear to those having ordinary skill in the present art, in view of the present disclosure. Thus, the invention is not limited to the copolymerization of only two different polyols, but indeed three or more different polyols may be interpolymerized. For example, two or more different polyester polyols may be homogeneously blended with two or more different polyether polyols, and co-prepolymers made therefrom by reaction with the polyisocyanate. Also, singular low molecular weight diols and/or polyols, such as 1,4-butanediol, glycerine, tetraethylene glycol, etc. can be incorporated into the polyol mixture prior to co-prepolymer formation with the diisocyanates, thereby further modifying the co-prepolymer systems.

Other materials, such as loading fillers or pigments, may also be optionally incorporated in conventional quantities during hand-mixed casting operations. Examples of loading fillers or pigments are red iron oxide and green chrome oxide, finely divided metals such as steel powder or aluminum powder, finely divided stone, clay or sand, carbonaceous material, glass fibers, etc. In addition, relatively minor amounts of other ingredients, such as dyes, age resistors, stabilizers, fungicides, visocisty regulators, dehydrating agents, accelerators or retardants, etc. may be incorporated into the compositions in accordance with conventional practice.

The following examples, in which amounts of all materials are expressed in parts by weight, will illustrate the manner in which the invention can be practised. It is to be understood that the specific conditions set forth in the examples are not to be considered limiting of the invention.

EXAMPLE 1

There are mixed together 100 parts of a blend of anhydrous polyester diols commercially available under the name LEXOREZ 3500-140 and 3500-90 (Inolex), which are formed of isophthalic and adipic acids with 1,6-hexane diol and neopentyl glycol, having an OH number of 112 (equivalent weight 500), and 100 parts of an anhydrous polytetramethylene diol (polyether diol) with an OH number of 112. To 150 parts of the homogeneous polyether/polyester mixture thus obtained, there are added 53 parts of 80/20 toluene diisocyanate (TDI) at room temperature. The mixture is allowed to exotherm at approximately 60°–65° C., and is then heated at 80°–85° C. for about 2 hours, after which the resultant liquid is then degassed.

The product so obtained is a clear homogeneous co-prepolymer with an NCO content of about 5.5%. This co-prepolymer, when cured in the conventional manner with Curene ® 442, i.e. 4,4'-methylene-bis (orthochloroaniline), yields an elastomeric polyurethane having the following average properties.

| | |
|---|---|
| Shore Hardness A | 95 |
| Elongation, % | 400–450 |
| Tensile Strength, psi | 7200 |
| Compression Set, % (Method B) | 26 |
| Die C Tear, pli | 650 |
| Split Tear, D-470 | 300 |

As can be seen, the physical properties are excellent, approximating those of premium polyesters; however the product also has good hydrolytic stability and low temperature properties superior to those of conventional polyesters and approximating those of premium polyether polyurethanes.

EXAMPLE 2

The procedure of Example 1 was repeated using, however, a different polyether, namely straight polyoxypropylene glycol (PPG) of OH number 112. As with the product of Example 1, this product also has excellent physical properties.

EXAMPLE 3

The procedure of Example 1 was again repeated, this time using as the polyether, an ethylene oxide capped polyoxypropylene glycol of OH number of 112. Once again, the compatible mixture provided a clear homogeneous co-prepolymer which was cured with Curene 442 to provide a urethane-urea cast elastomer having excellent physical properties.

EXAMPLE 4

The procedure of Example 3 was repeated, except that the polyester diol used was an ethylene glycol adipate with OH number 112. Once again, the polyester and polyether were compatible and were successfully reacted with the TDI to obtain a clear homogeneous co-prepolymer which in turn was cured with Curene 442 to provide a cast polyurethane elastomer having excellent physical properties.

EXAMPLE 5

Example 3 was again repeated, this time using propylene glycol adipate, of OH number 112, as the polyester diol. Results were similar to those of the earlier examples.

EXAMPLE 6

Example 3 was again repeated, this time using as the polyester an adipate-isophthalate of 1,6-hexane diol, of OH number 112. Once again the results were excellent.

EXAMPLE 7

Once again example 3 was repeated, this time using an adipate-isophthalate of 1,6-hexane diol and neopentyl glycol, having an OH number of 112, as the polyester. Again results were excellent.

EXAMPLES 8–33

Following the general procedure of Example 1, co-prepolymers were prepared at various NCO/OH ratios in the range of 1.67/1 to 1.95/1, the diisocyanate utilized being 80/20 TDI. The results are shown in the table below:

| Example | Polyester Polyol | | Polyether Polyol | | NCO/OH |
|---|---|---|---|---|---|
| 8 | Ethylene glycol adipate | MW 1000 | Ethylene oxide capped polyoxypropylene glycol | MW 1000 | 1.85/1 |
| 9 | " | MW 1000 | " | MW 1000 | 1.67/1 |
| 10 | " | MW 2000 | " | MW 2000 | 1.85/1 |
| 11 | " | MW 2000 | " | MW 2000 | 1.67/1 |
| 12 | Adipate-isophthalate of 1,6-hexane diol | MW 1000 | Polytetramethylene glycol | MW 1000 | 1.85/1 |
| 13 | " | MW 1000 | " | MW 1000 | 1.95/1 |
| 14 | " | MW 1000 | Polyoxypropylene glycol | MW 1000 | 1.85/1 |
| 15 | " | MW 1000 | Ethylene oxide capped polyoxypropylene glycol | MW 1000 | 1.85/1 |
| 16 | " | MW 2000 | Polytetramethylene glycol | MW 1000 | 1.85/1 |
| 17 | " | MW 2000 | " | MW 2000 | 1.85/1 |
| 18 | " | MW 2000 | Ethylene oxide capped polyoxypropylene glycol | MW 2000 | 1.95/1 |
| 19 | " | MW 2000 | " | MW 3000 | 1.95/1 |
| 20 | Adipate-isophthalate of neopentyl glycol and 1,6-hexane diol | MW 1000 | Polytetramethylene glycol | MW 1000 | 1.75/1 |
| 21 | " | MW 1000 | " | MW 1000 | 1.95/1 |
| 22 | " | MW 1000 | Polyoxypropylene glycol | MW 1000 | 1.75/1 |
| 23 | " | MW 1000 | " | MW 1000 | 1.95/1 |
| 24 | " | MW 1000 | Ethylene oxide capped polyoxypreopylene glycol | MW 1000 | 1.75/1 |
| 25 | " | MW 1000 | " | MW 1000 | 1.95/1 |

-continued

| Example | Polyester Polyol | | Polyether Polyol | | NCO/OH |
|---|---|---|---|---|---|
| 26 | " | MW 2000 | " | MW 2000 | 1.85/1 |
| 27 | Adipate of neopentyl glycol and 1,6-hexane diol | MW 3000 | " | MW 3000 | 1.85/1 |
| 28 | " | MW 1000 | Polytetramethylene glycol | MW 1000 | 1.75/1 |
| 29 | " | MW 1000 | " | MW 1000 | 1.95/1 |
| 30 | " | MW 1000 | Polyoxypropylene glycol | MW 1000 | 1.75/1 |
| 31 | " | MW 1000 | " | MW 1000 | 1.95/1 |
| 32 | " | MW 1000 | Ethylene oxide capped poly-oxypropylene glycol | MW 1000 | 1.75/1 |
| 33 | " | MW 1000 | " | MW 1000 | 1.95/1 |

EXAMPLE 34

Reacting 0.5 equivalents of polyester S-1019-120 (Ruco Division of Hooker) and 0.5 equivalents of Polymeg 1000 (Quaker Oats) with 80/20 TDI, a clear homogeneous polyester-polyether co-prepolymer was obtained which, when cured with 95% stoichiometry of Curene 442, gave an elastomer with the following characteristics:

| Hardness | 90A |
|---|---|
| Tensile Strength, psi | 6000+ |
| Elongation, % | 400–450 |
| Die C Tear, pli | 650 |
| Split Tear, pli | 200+ |
| Compression Set, % | 26 |

The above property shows the elastomer to be at least equivalent to premium polyester urethanes currently commercially available, with hydrolytic stability and low temperature properties comparable to premium polyether urethanes.

EXAMPLE 35

Using commercially available polyesters and polyethers, as identified by tradename below, co-prepolymers were prepared using equal portions of polyester and polyether, and 80/20 TDI as the polyisocyanate:

1. Polyester S-1040-120 (Ruco Division of Hooker)
Polymeg 650 (Quaker Oats)
2. Polyester S-1019-120 (Ruco)
Polymeg 650 (Quaker Oats)
3. Polyester E-366 (Mobay)
Polymeg 1000 (Quaker Oats)
4. Polyester S-1019-55 (Ruco)
Polymeg 1000 (Quaker Oats)
5. Polyester Lexorez-1100-55 (Inolex)
Polyether Poly-G 55-112 (Olin)
6. Polyester E-366 (Mobay)
Polyether 55-112 (Olin)
7. Polyester S-1040-55 (Ruco)
Polyether Poly-G 755-37 (Olin)
8. Polyester S-1040-55 (Ruco)
Polyether Poly-G 55-56 (Olin)
9. Polyester R-14 (Mobay)
Polyether Poly-G 55-56 (Olin)
10. Polyester Lexorez 1100-115 (Inolex)
Polyether Poly-G 55-112 (Olin)

It will be obvious to those skilled in the art that various changes may be made without departing from the scope of the invention and the invention is not to be considered limited to what is described in the specification.

What is claimed is:

1. A stable and storable co-prepolymer liquid at normal temperatures, suitable for casting with a curing agent to provide a cast polyurethane resin elastomer, said co-prepolymer having ester and ether groups in the backbone of the polymer chain and comprising a homogeneous liquid which is the reaction product of an organic polyisocyanate, at least one polyester polyol and at least one polyether polyol, the ratio of NCO to OH in the reaction mixture being about 1.5:1 to about 2:1, said polyether polyol being compatible with said polyester polyol, and the relative quantities of said polyester and polyether being 15%–85% to 85%–15%.

2. A co-prepolymer in accordance with claim 1 formed from a mixture of polyols consisting of about 50% polyester and about 50% polyether.

3. A co-prepolymer in accordance with claim 1 wherein said NCO/OH ratio is 1.67:1 to 1.95:1.

4. A co-prepolymer in accordance with claim 1 wherein said polyester polyol is the reaction product of an aromatic acid and an aliphatic diol containing more than three carbon atoms; and said polyether polyol is a polytetramethylene glycol polyol.

5. A co-prepolymer in accordance with claim 1 wherein said polyester polyol is the reaction product of an aliphatic diacid and a glycol selected from the group consisting of ethylene glycol, diethylene glycol, triethylene glycol, tetraethylene glycol and mixtures thereof; and said polyether polyol is a polypropylene glycol polyol capped with ethylene oxide.

6. A co-prepolymer in accordance with claim 1 wherein the compatible mixture of polyester and polyether is selected from the group consisting of ethylene glycol adipate with ethylene oxide capped polyoxypropylene glycol; adipate-isophthalate of 1,6-hexane diol with any of ethylene oxide capped polyoxypropylene glycol, polytetramethylene glycol or polyoxypropylene glycol; propylene glycol adipate with ethylene oxide capped polyoxypropylene glycol or polyoxypropylene glycol; adipate-isophthalate of neopentyl glycol and 1,6-hexane diol with polytetramethylene glycol, polyoxypropylene glycol, or ethylene oxide capped polyoxypropylene glycol; isophthalate of glycerine with polytetramethylene glcyol, polyoxypropylene glycol, or ethylene oxide capped polyoxypropylene glycol; and adipate of diethylene glycol, 1,6-hexane diol, neopentyl glycol and trimethylol propane with ethylene oxide capped polyoxypropylene glycol.

7. A co-prepolymer in accordance with claim 1 wherein said polyisocyanate is toluene diisocyanate, hexamethylene diisocyanate, isophorone diisocyanate, or 4,4'-diphenyl methane diisocyanate.

* * * * *